United States Patent [19]

Ohashi et al.

[11] Patent Number: 4,811,143

[45] Date of Patent: Mar. 7, 1989

[54] HEAD SUPPORTING MECHANISM FOR MAINTAINING CLOSE OPERATIVE RELATIONSHIP BETWEEN MAGNETIC HEADS AND A FLEXIBLE DISK

[75] Inventors: Hiroshi Ohashi; Toshiyuki Fujioka; Masahiro Kusunoki; Susumu Kimura; Shigeru Takekado, all of Tokyo, Japan

[73] Assignee: Kabushiki Kaisha Toshiba, Kawasaki, Japan

[21] Appl. No.: 32,016

[22] Filed: Mar. 30, 1987

[30] Foreign Application Priority Data

Mar. 31, 1986 [JP] Japan .................................. 61-72991
Apr. 28, 1986 [JP] Japan .................................. 61-96838
Aug. 25, 1986 [JP] Japan .................................. 61-197070

[51] Int. Cl.$^4$ ........................ G11B 5/54; G11B 21/21; G11B 21/22
[52] U.S. Cl. .................................. 360/105; 360/104; 360/130.2
[58] Field of Search ....................... 360/105, 104, 130.2

[56] References Cited

U.S. PATENT DOCUMENTS

| | | | |
|---|---|---|---|
| 3,931,641 | 1/1976 | Watrous | 360/104 |
| 4,089,029 | 5/1978 | Castrodale et al. | 360/99 |
| 4,151,573 | 4/1979 | Tandon et al. | 360/104 |
| 4,167,765 | 9/1979 | Watrous | 360/104 |
| 4,208,684 | 6/1980 | Janssen et al. | 360/104 |
| 4,306,258 | 12/1981 | Higashiyama et al. | 360/99 |
| 4,315,293 | 2/1982 | Winkler | 360/130.2 |
| 4,327,388 | 4/1982 | Wanek | 360/104 |
| 4,347,535 | 8/1982 | Dalziel | 360/99 |
| 4,355,339 | 10/1982 | King et al. | 360/105 |
| 4,379,315 | 4/1983 | Schuler | 360/105 |
| 4,433,352 | 2/1984 | De Marco | 360/105 |
| 4,658,315 | 4/1987 | Seki et al. | 360/99 |
| 4,703,375 | 10/1987 | Chan et al. | 360/105 |

Primary Examiner—Robert S. Tupper
Attorney, Agent, or Firm—Foley & Lardner, Schwartz, Jeffery, Schwaab, Mack, Blumenthal & Evans

[57] ABSTRACT

Leaf spring is fixed at one end thereto to a carriage, and extended at a predetermined angle to the carriage. A part of the leaf spring has rigidity. A gimbal spring, which free from the carriage, is mounted on the rigid portion. Head is fixed to the gimbal spring. The head can move perpendicularly to the carriage by the operation of the leaf spring, and can roll and pitch by the operation of the gimbal spring. Thus, the head can follow to move elevationally upward and downward and incline to the disk-like recording medium and contact the medium with good contacting property.

14 Claims, 19 Drawing Sheets

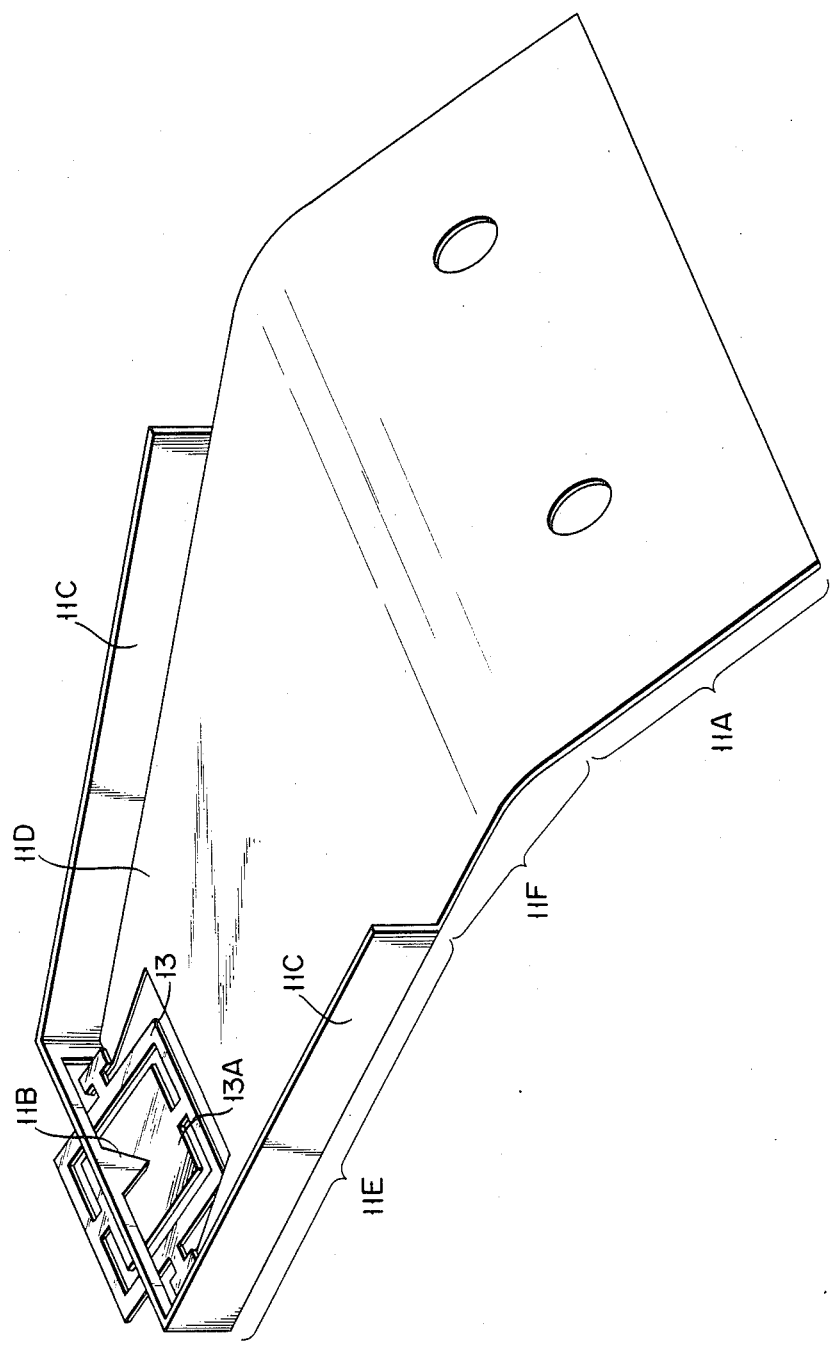

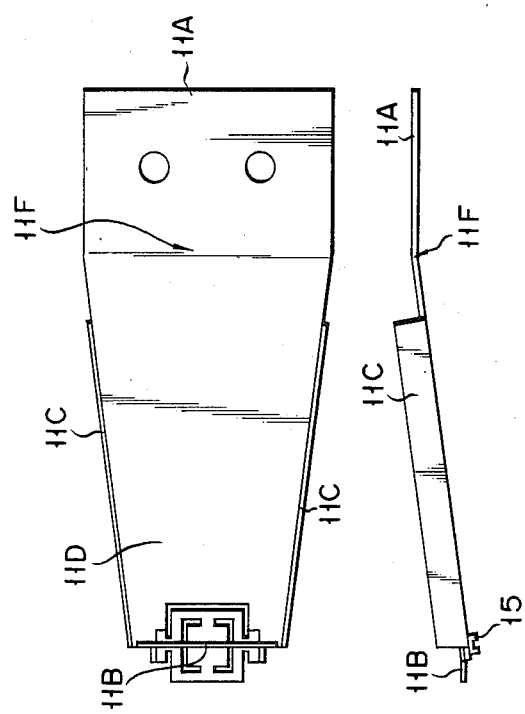

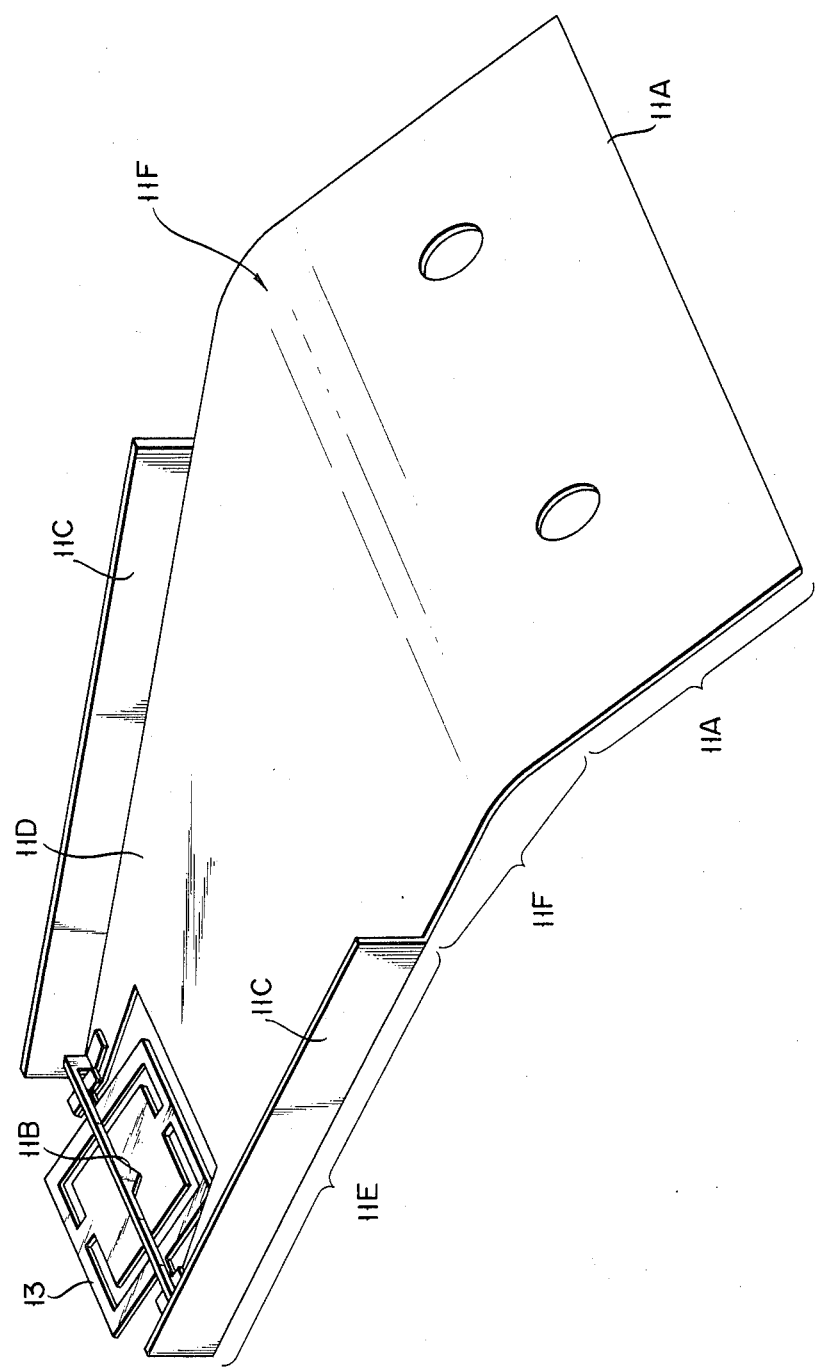

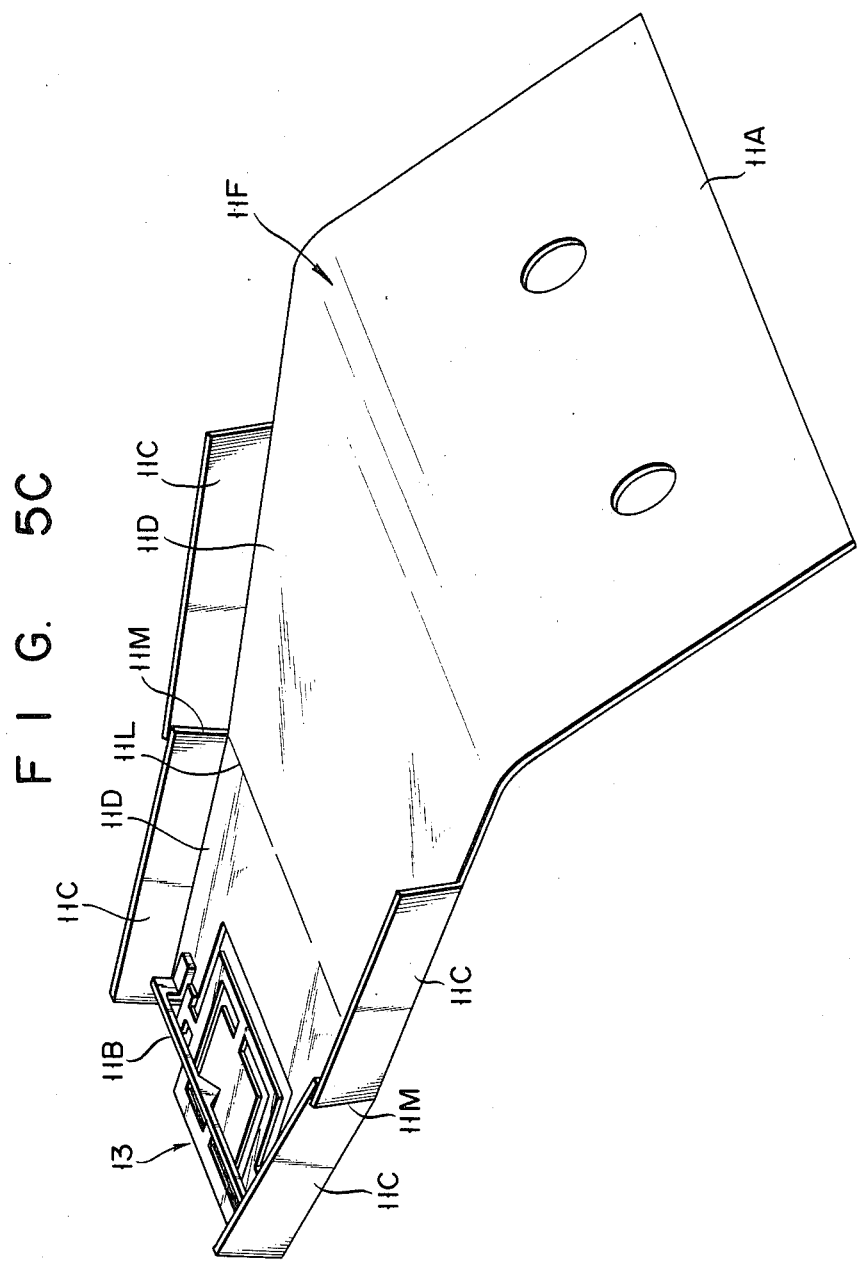

F I G. 6A
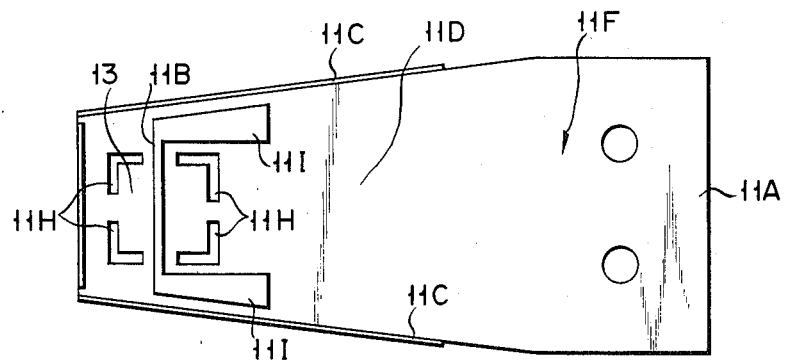
F I G. 6B
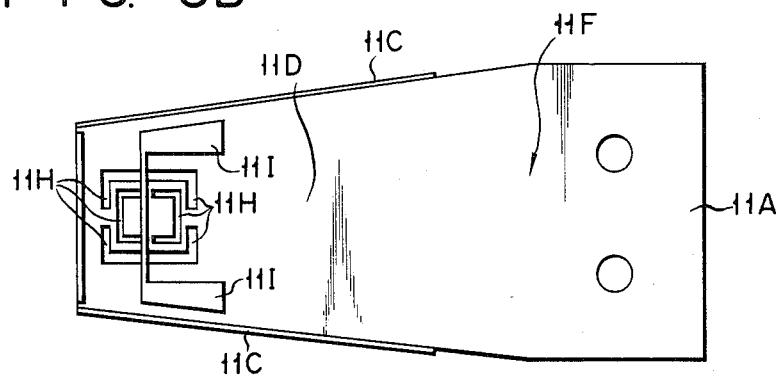
F I G. 7
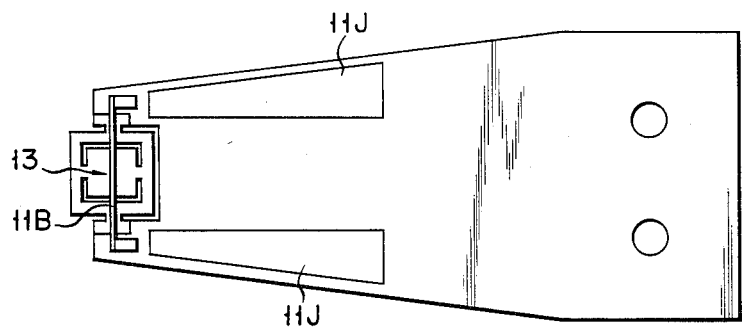

F I G. 8A 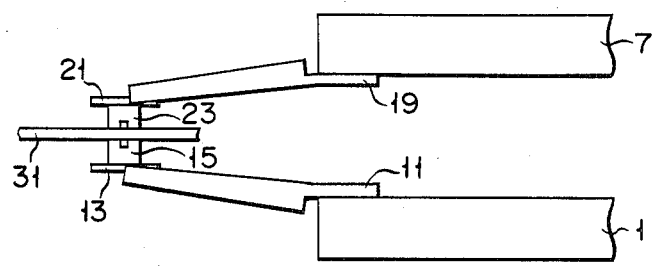
F I G. 8B 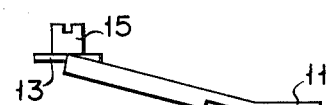
F I G. 8C 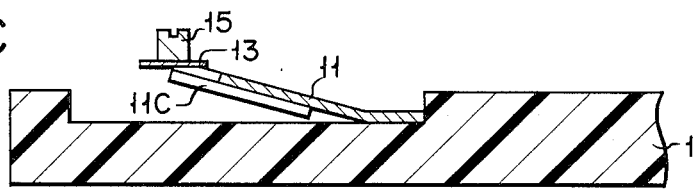
F I G. 8D 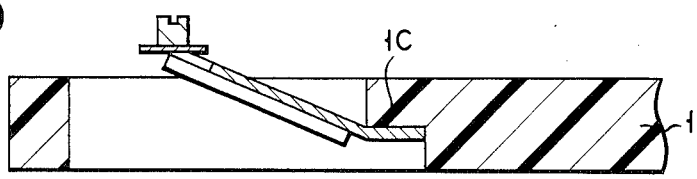

F I G. 14
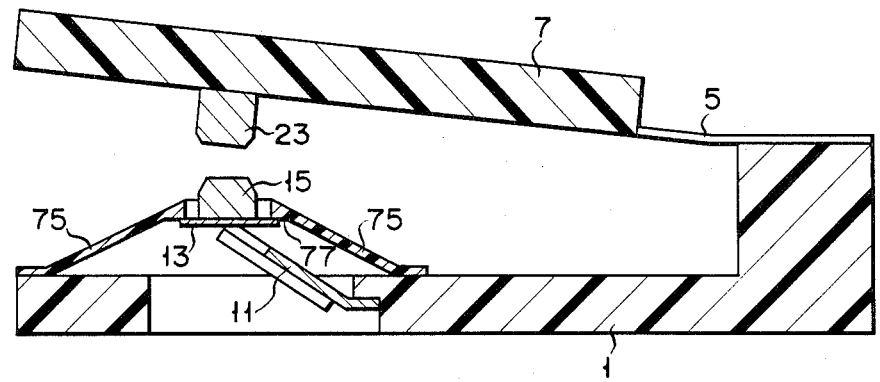
F I G. 15
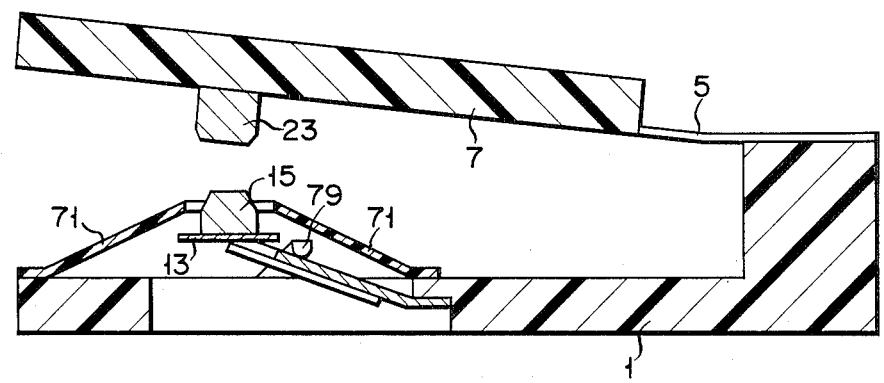

F I G. 16
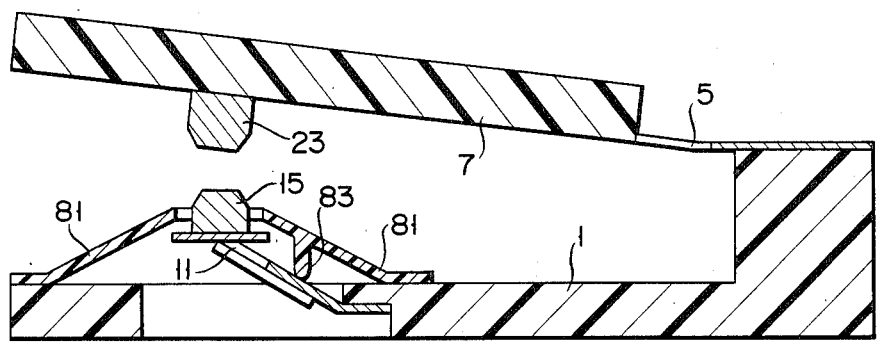
F I G. 17
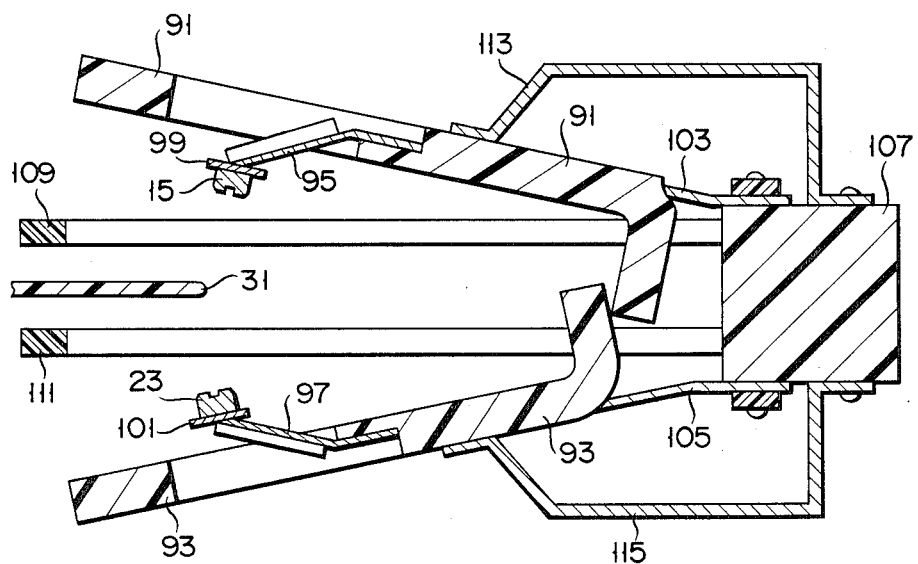

FIG. 18A
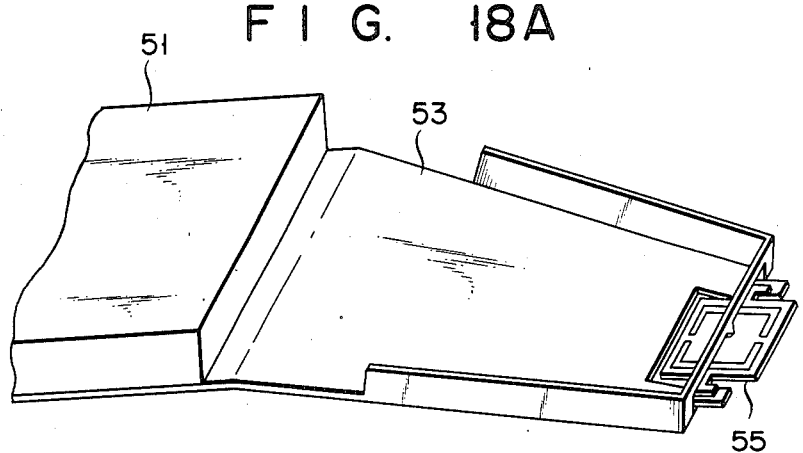
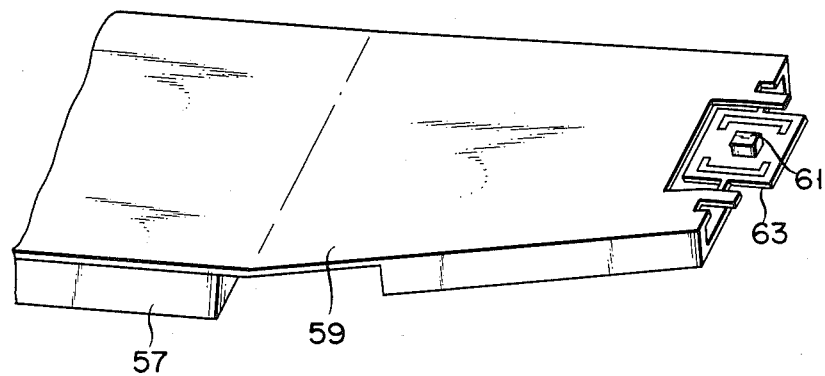
FIG. 18B
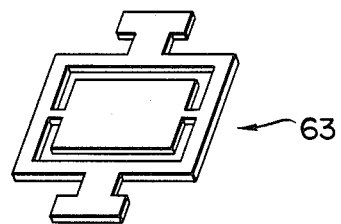
FIG. 18C
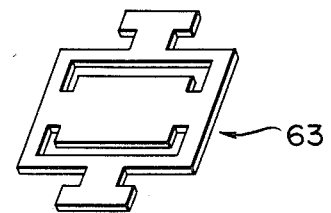

HEAD SUPPORTING MECHANISM FOR MAINTAINING CLOSE OPERATIVE RELATIONSHIP BETWEEN MAGNETIC HEADS AND A FLEXIBLE DISK

BACKGROUND OF THE INVENTION

This invention relates to improvements in a head supporting mechanism for a floppy disk apparatus.

A mechanism for supporting heads for reading data from a disk-like magnetic recording medium and writing data on the recording medium is known.

Such a head supporting mechanism disclosed, for example, in FIGS. 10 and 11 of U.S. Pat. No. 4,089,029 (Castrodale et al) is known. FIGS. 10 and 12 of Castrodale et al. show a head supporting mechanism comprising an arm, slender gimbal springs fixed at one end to the arm, heads fixed to the springs, and a spring pivot for urging the portions of the springs where the heads are mounted from the back sides toward the medium. The head supporting mechanism of this structure has various disadvantages as pointed out, for example, in the first and second columns of U.S. Pat. No. 4,151,573 (Tandon et al). More specifically, since the, gimbal springs have long and flexible leaf springs each fixed only at one end thereof on the corresponding arm, (1) The heads easily vibrate by deviation of the medium from its nominal plane, so it is difficult to obtaining good touch between the head and the recording medium. (2) The heads are weak to external vibrations. (3) The corners of the heads rub the surface of the recording medium when positioning the heads on the recording medium, the recording medium is readily damaged. (4) The manufacture is difficult.

Magnetic head supporting mechanisms disclosed in the Tandon et al patent and U.S. Pat. No. 4,306,258 (Higashiyama et al.) have been proposed to improve such disadvantages.

Tandon et al discloses a head supporting mechanism comprising a carriage, a head fixed to the carriage, an arm, a gimbal spring fixed to the arm, a head fixed to the spring, and a stationary pivot supporting the back surface of the gimbal spring at the distal end thereof. In Tandon et al, the head of the carriage side is fixed directly to the carriage, while the head of the arm, side is fixed to the gimbal spring. Since the back side of the gimbal spring is supported by the pivot, the gimbal spring does not substantially move in a direction normal to the nominal plane of the medium except that the head moves together with the arm. Thus, the heads can hardly follow to the movement of the recording medium is ironed out by forcing the gimbaled head toward the fixed head (1) Therefore, the life of the recording medium is shortened. (2) Further, the contacting characteristic of the recording medium with the heads is deteriorated. (3) Since the arm where the gimbaled head is mounted is heavy, and imposes a large mass of the arm on the gimbaled head, the head is weak for external vibration.

The Higashiyama et al discloses a head supporting mechanism comprising a carriage, arms fixed to the carriage, arms fixed to the bases, gimbal springs fixed to the arms, and heads fixed to the gimbal springs. The heads are loaded toward the medium only by the force produced by the deflection of the gimbal springs in this structure, the gimbal springs are sometimes mechanically overloaded and the life of the gimbal springs are shortened. Further, the durability of the gimbal springs is low. (2) Spring constants of the gimbal springs in the direction perpendicular to the recording medium cannot be set independently of spring constants of the gimbal springs both in the radial direction of the recording medium and in the direction tangential to the recording medium. Therefore, optimum spring constants cannot be obtained.

SUMMARY OF THE INVENTION

An object of this invention is to provide a head supporting mechanism of floppy disk apparatus which eliminates the above-mentioned disadvantages and has higher performance.

In order to achieve the above and other objects, there is provided according to the present invention a head supporting mechanism for a floppy disk apparatus comprising first head means contacting with a first plane of the flexible disk-like recording medium for reading/writing data from/to the first plane;

first gimbal means for holding said first head means so that said first head means can incline with respect to the first plane;

first holding means having first pivot means and a first spring portion, said first pivot means being for limiting the deformation of the first gimbal means, said first spring portion enabling that said first head means, said first gimbal means and said first pivot means to move in the direction perpendicular to the first plane;

first supporting means for supporting said first holding means;

second head means opposing to said first head means and contacting a second plane of the medium for reading/writing data from/to the second plane;

second holding means having a second spring portion, said second spring portion enabling said second head means to move in the direction perpendicular to the second plane;

second supporting means for supporting said second holding means;

loading means for loading at least one of said first and second supporting means toward the medium, so as to interpose said medium between both of said first and second head means; and a stopper means for limiting movement of at least one of said first and second supporting means toward the medium, wherein when said at least one of said first and second supporting means are pressed on said stopper means, at least one of said first and second spring portions is deformed, thus producing a force for placing said first and second head means in contact with the medium.

According to the head supporting mechanism thus constructed as described above, the movement of the first and second head means perpendicular to the surface of recording medium can be independent to the inclining operation of the heads. So spring constant of the first and second holding means in the direction perpendicular to the recording medium can be set independently of spring constants of the gimbal means both in the radial direction of the recording medium and in the direction tangential to the recording medium. Therefore, optimum constructions can be selected for the respective movements. The gimbal means is held, by the holding means which has rigid construction, so the head means hardly vibrates, and has good characteristic to the external vibration. The head means can move, even if disk-like recording medium is deflected or slackened, in response to the movement of the medium within a predetermined range to always contact with the medium in the best state. Therefore, the contacting characteristics of the head means with the medium are improved and the medium is less damaged as compared with the conventional example that the heads are fixed to the supports.

BRIEF DESCRIPTION OF THE DRAWINGS

FIGS. 3A to 3D show example of a supporting member in FIGS. 1 and 2;

FIGS. 5A to FIG. 9, 18A to 18C are views for describing other embodiments of the invention;

FIGS. 10 to 16 are views for describing embodiments having means for preventing a medium guide and a head from jumping out in the construction shown in FIGS. 1 and 3; and FIG. 17 is a perspective view for describing embodiments applied with the invention to an both sides open type heads supporting mechanism.

DETAILED DESCRIPTION OF THE PREFERRED EMBODIMENTS

Figure 1:
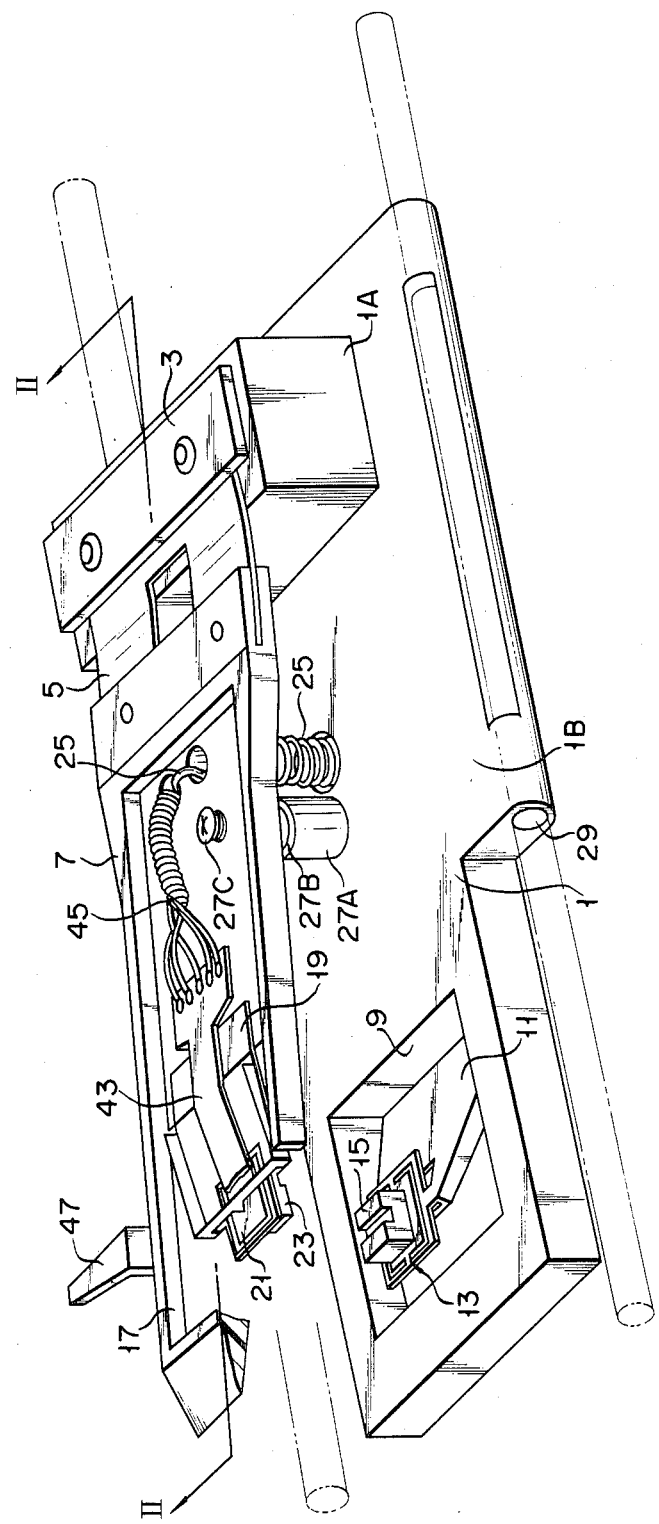
FIG. 1 a perspective view of an embodiment of a head supporting mechanism according to the present invention.
Figure 2:
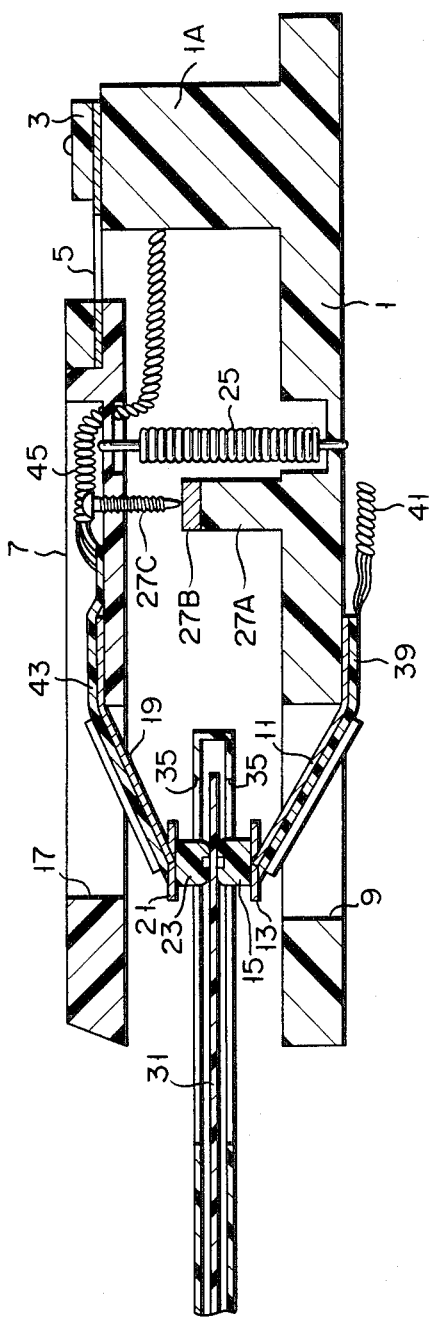
FIG. 2 is a sectional view showing the construction in FIG. 1 in an operating state taken along the line II—II.

An embodiment of a head supporting mechanism (carriage assembly) for a floppy disk apparatus according to the present invention will be described in detail with reference to FIGS. 1 and 2. FIG. 1 is a perspective view of a head supporting mechanism a nonoperating state, and FIG. 2 is a sectional view of the operating state of the construction in FIG. 1, taken along the line II—II. Unnecessary portions for description are omitted and the drawings are modified in FIGS. 1 and 2 for a ready understanding.

The head supporting mechanism of this embodiment generally comprises carriage 1 and head arm 7. Carriage 1 and arm 7 are fixed as follows: leaf spring 5 is fixed to one end of arm 7 and leaf spring 5 is fixed to the stationary portion 1A of carriage 1 with bracket 3.

Opening 9 is formed at carriage 1. Supporting member 11 is fixed to the lower surface of carriage 1. Supporting member 11 extends through opening 9 to the upper surface of carriage 1. Supporting member 11 is formed in the shape, for example,.as shown in FIG. 3A. (A detailed description will be explained later.) Supporting member 11 extends at a predetermined angle to carriage 1 in the state fixed to carriage 1. Gimbal spring 13 is fixed to the end of supporting member 11. Gimbal spring 13 is free from carriage 1. Gimbal spring 13 is so fixed to supporting member 11 that the surface mounted with the head is substantially parallel to the recording medium. Magnetic head 15 is fixed to gimbal spring 13. Head 15 is formed of a magnetic core and a slider for surrounding the core ordinarily known per se. Supporting member 11 presses head 15 by a force of approx. 20 g when head 15 contacts a recording medium.

Opening 17 is formed at arm 7. Supporting member 19 is fixed to the upper surface of arm 7. Supporting member 19 extends through opening 17 located under arm 7. In this embodiment, supporting member 19 has substantially the same construction as supporting member 11. Supporting member 19 extends at a predetermined angle to arm 7 in the state fixed to arm 7. Gimbal spring 21 is fixed to the end of supporting member 19. Gimbal spring 21 is free from arm 7. Gimbal spring 21 is so fixed to supporting member 19 as to become substantially parallel to the recording medium when arm 7 is loaded and both heads are in the close operative relation with the recording medium. Head 23 is fixed to gimbal spring 21. Supporting member 19 presses head 21 by a force of approx. 20 g when head 23 contacts the recording medium. Coils of heads 15, 23 are mounted on the back sides of gimbal springs 13, 21, but are omitted from FIGS. 1 and 2 for readily understanding of shape of gimbal spring 21.

Coiled spring 25 is mounted between carriage 1 and arm 7 to pull arm 7 toward carriage 1 (FIG. 2). Plinth 27A is provided on carriage 1. Member 27B is provided on plinth 27A, and is made of metal. Screw 27C is provided in arm 7. Screw 27C is used to adjust the distance between the distal end of arm 7 and the distal end of carriage 1 when both heads are in the close operative relation with the recording medium. Screw 27C projects a predetermined height under the surface of arm 7 toward carriage 1. The tip of screw 27C abuts against member 27B. When this apparatus is in operation, the tip of screw 27C abuts against member 27B. Plinth 27A, member 27B, and screw 27C together comprise arm stopper (27) which maintains the distance between the distal end of arm 7 and the distal end of carriage 1 at a predetermined value during the time the disk apparatus is in operation. Guiding openings 29 are formed at holders 1B of carriage 1, and guide rails are inserted through openings 28.

Heads 15, 23 contact disk-like recording medium (floppy disk) 31 in the state that arm 7 has pivoted toward carriage 1 until the tip of screw 27C abuts against member 27B (FIG. 2). Jacket 33 covers medium 31, and windows (head windows) 35 are formed at medium 31 to contact heads 15, 23 with medium 31.

The coils of heads 15, 23 are electrically connected to flexible printed cables 39, 43 on the back side of gimbal springs 13, 21. Cables 39, 43 are electrically connected to wires 41, 45, which are led externally of the head supporting mechanism, and connected to a read/write control circuit, not shown.

A knob 47 (FIG. 1) is provided at arm 7. A loading-/unloading mechanism (not shown) abuts against knob 47. Knob 47 is raised to pull up arm 7 by the loading/unloading mechanism.

The operation of the head supporting mechanism constructed as described above will be described. When medium 31 is not set in the disk apparatus, the loading-/unloading mechanism rotates arm 7 with leaf spring 5 connected to carriage 1, upwardly against the force exerted by coiled spring 25 as shown in FIG. 1. After medium 31 is set in the apparatus, arm 7 rotates around leaf spring 5 toward carriage 1, by force exerted by coiled spring 25. The tip of screw 27C abuts against member 27B, as shown in FIG. 2. Head 23 contacts with medium 31, just before screw 27C abuts against member 27B. Since a force generated by coiled spring 25 is exerted on both heads 25 and 23 mounted on supporting members 11 and 19 after head 23 has contacted with medium 31 on the other head 15 spring portion 11F of supporting member 19 is deformed. Spring portion 11F generate forces for urging head 23 onto medium 31. Simultaneously, spring portion of member 11 generates a force for urging head 15 to medium 31. Medium 31 is stabilized in such a position that the force generated by member 19 is balanced with the force generated by member 11. In this state, arm 7 is pressed against arm stopper 27. Arm 7 does not move in accordance with the movement of medium 31. Parts, which move in accordance with the deflection or slackening of the medium during the read/write operation, are light in weight and stiff. Therefore this supporting mechanism has good characteristics for slight vibration of heads 15, 23 and external vibration, so that an excellent reproduced output signal can be obtained.

By driving screw 27C, the length of the screw projecting from arm 7 can be adjusted. Therefore, the distance between the distal end of arm 7 and the distal end of carriage 1 can be adjusted, even after the head supporting mechanism has been assembled. Arm 7 is pressed against member 27B by the force of coiled spring 25. Therefore, arm 7 is prevented from removing from carriage 1. On the other hand, when medium 31 is attached to and detached from the apparatus, the loading/unloading mechanism rotates arm 7 around leaf spring 5, upwardly against the force of coiled spring 25, as shown in FIG. 1. Head 23 is separated from medium 31.

The mechanism is moved on the guide rails by driving means, not shown (e.g., by a stepping motor) to dispose heads 15, 23 on tracks to be processed. Heads 15, 23 read data from tracks to be processed of medium 31 in read mode. Signals read by heads 15, 23 are supplied through cable 39, 43 and wires 41, 45 to the read/write control circuit. The control circuit translates the data according to the signals supplied thereto. The control circuit supplies a writing current through cables 39, 43 and wires 41, 45 to heads 15, 23, which output magnetic fluxes corresponding to the currents to record data on medium 31.

Then, the construction and the operations of supporting members 11, 19, and springs 13, 21 of the features of the embodiment will be described.

Since supporting member 11 and gimbal spring 21 have the same construction as supporting member 19 and gimbal spring 13, respectively, they will not be described in detail. As is shown in FIGS. 3A, 3B and 3C, supporting member 11 is generally a leaf spring and comprises a rigid portion 11E, fastening portion 11A and spring portion 11F connecting the rigid portion 11E and the fastening portion 11A. The rigid portion 11E has portion 11D and to bent portions 11C at both sides of portion 11D, and has a high degree of a rigidity. Bent portions 11C are located near the head-mounting portion (gimbal spring 13) of supporting member 11 and give a high degree of rigidity to rigid portion 11E. Fastening portion 11A is fastened by, for example, screws, to carriage 1. Hence, only portion 11F is flexible and serves as a spring. As shown in FIG. 3B, supporting member 11 is trapezoidal, narrowing toward gimbal spring 13. Hence, the rigidity of its rigid portion 11E increases toward gimbal spring 13.

Gimbal spring 13 is mounted at the end of supporting member 11 so as to be substantially horizontal in the operating state. Gimbal spring 13 is free from carriage 11. Central portion 13A of gimbal spring 13 is rotatable around two axes which are perpendicular to each other. Thus, magnetic head 15 fixed to portion 13A is relatively freely rotatable around the two axes. Gimbal spring 13 is retained on the back by pivot 11B. Pivot 11B is formed of an inverted U-shaped member. A triangular portion is formed at the center of the U-shaped member, and the end of the triangular portion contacts the back surface of gimbal spring 13. Pivot 11B is fixed by spot welding, for example, to supporting member 11.

Figure 3D:
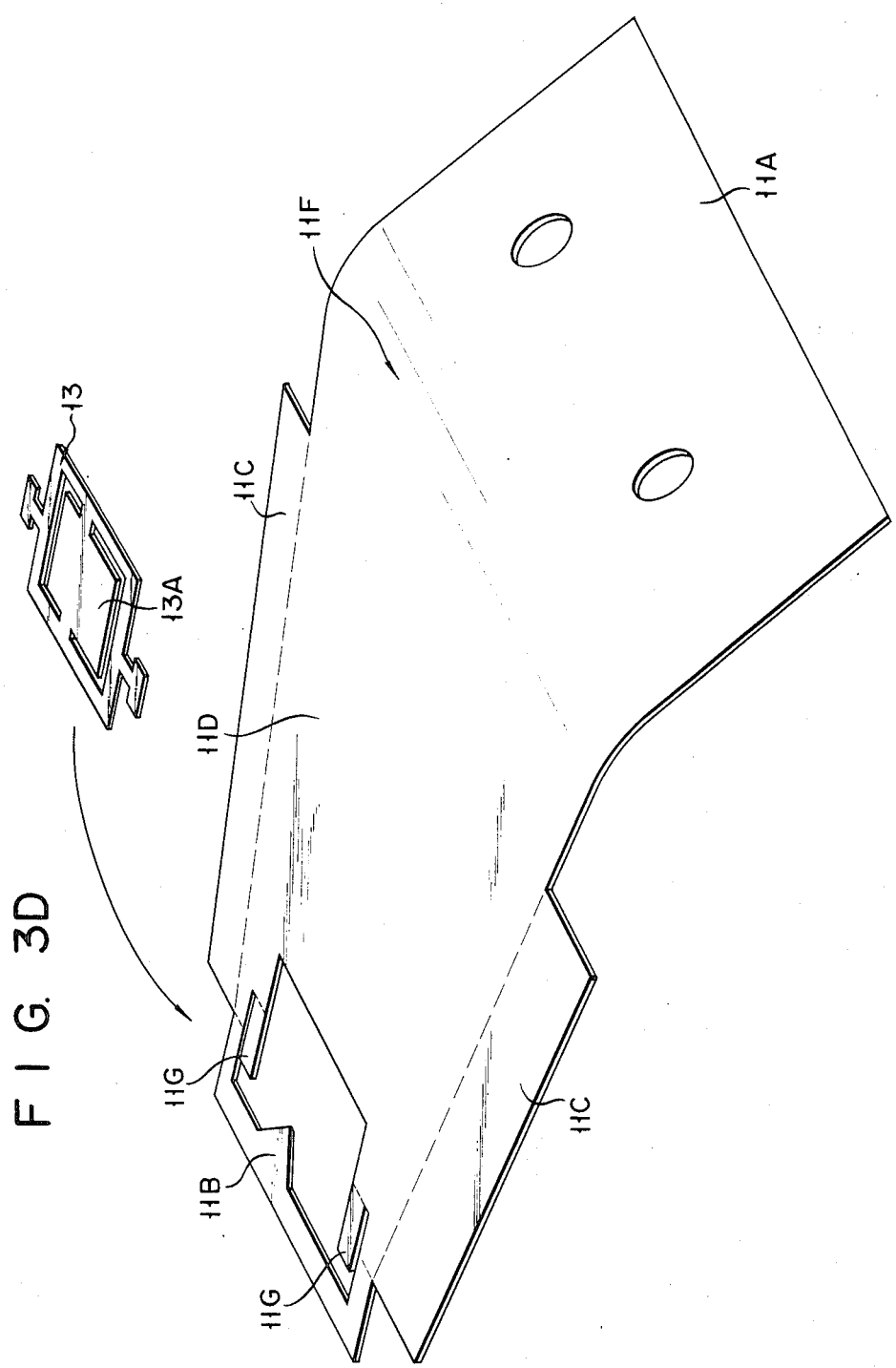

Supporting member 11 and gimbal spring 13 in FIG. 3A are formed, for example, as below. A flat plate of the shape in FIG. 3D is formed. The spring portion 11F of the flat plate is deformed. Parts 11B, 11C and 11G of the leaf spring are bent along broken lines. Gimbal spring 13 is mounted on the parts 11G so as to be substantially horizontal in the operating state.

Then, the operations of supporting member 11, gimbal spring 13 and head 15 fixed thereto will be described. Rigid portion 11E of supporting member 11 has large rigidity. On the contrary, spring portion 11F and fastening portion 11A have small rigidity and are flexible. Thus, supporting member 11 so supports magnetic head 17 as to elevationally move upward and downward (by the operation of spring portion 11F) in the state that supporting member 11 is fixed to carriage 11, but does not substantially move in the rotating direction of medium 31. Further, substantially only spring portion 11F, has elasticity, and entire supporting member 11 is neither deflected nor deformed.

Gimbal spring 13 supports head 17 as to be capable of pitching and rolling (head 15 can incline). However, since the back surface of gimbal spring 13 is retained by pivot 11B, gimbal spring 13 itself cannot allow head 15 to move elevationally upward and downward.

Figure 4A:
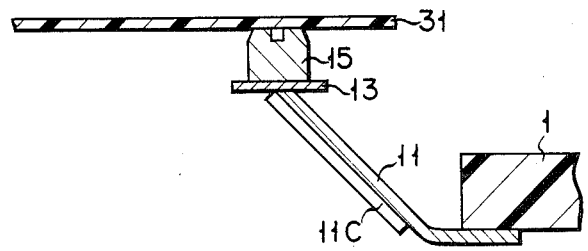
FIGS. 4A to 4C are sectional views for describing the movements of the supporting member and a head shown in FIG. 1.
Figure 4B:
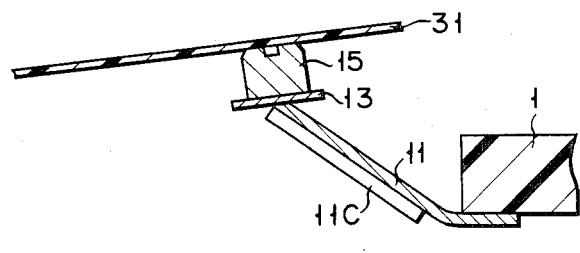
Figure 4C:
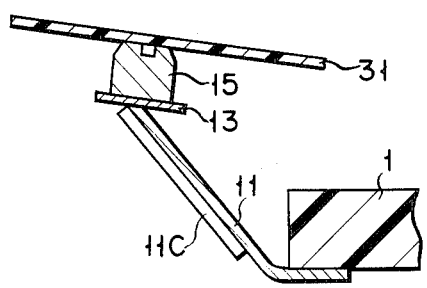

Thus, in the embodiment described above, supporting member 11 enables head 15 to move elevationally upward and downward, and gimbal spring 13 enables head 15 to incline so that supporting member 11 and gimbal spring 13 operate independently. Supporting member 11 and gimbal spring 13 can be designed so as to have optimum elasticities. Therefore, head 15 displaces from the original position shown in FIG. 4A, for example, to positions and angles as shown in FIGS. 4B and 4C in response to the distortion or the inclination of the medium 31. Thus, the improper contact of head 15 with medium 31 hardly occurs. Even if the rigidity of the medium increases as the recent medium reduction in size, the magnetic head hardly contacts improperly the medium. Head 23 and medium 31 operate similarly.

So, in the operating time, weight of arm 7 and spring constant of coiled spring 25 do not affect to operation of heads 15, 23. Coiled spring 25 can provide large load to arm 7. Characteristic to vibration of arm 7 is improved.

The force for pressing heads 15, 23 against medium 31 is provided by spring portions 11F of supporting members 11, 19. Arm 7 is pressed to member 27B, and maintained in a stationary position. If the stationary arm is used, the rigidity of the arm is increased to improve the vibration resistance.

Figure 5B:
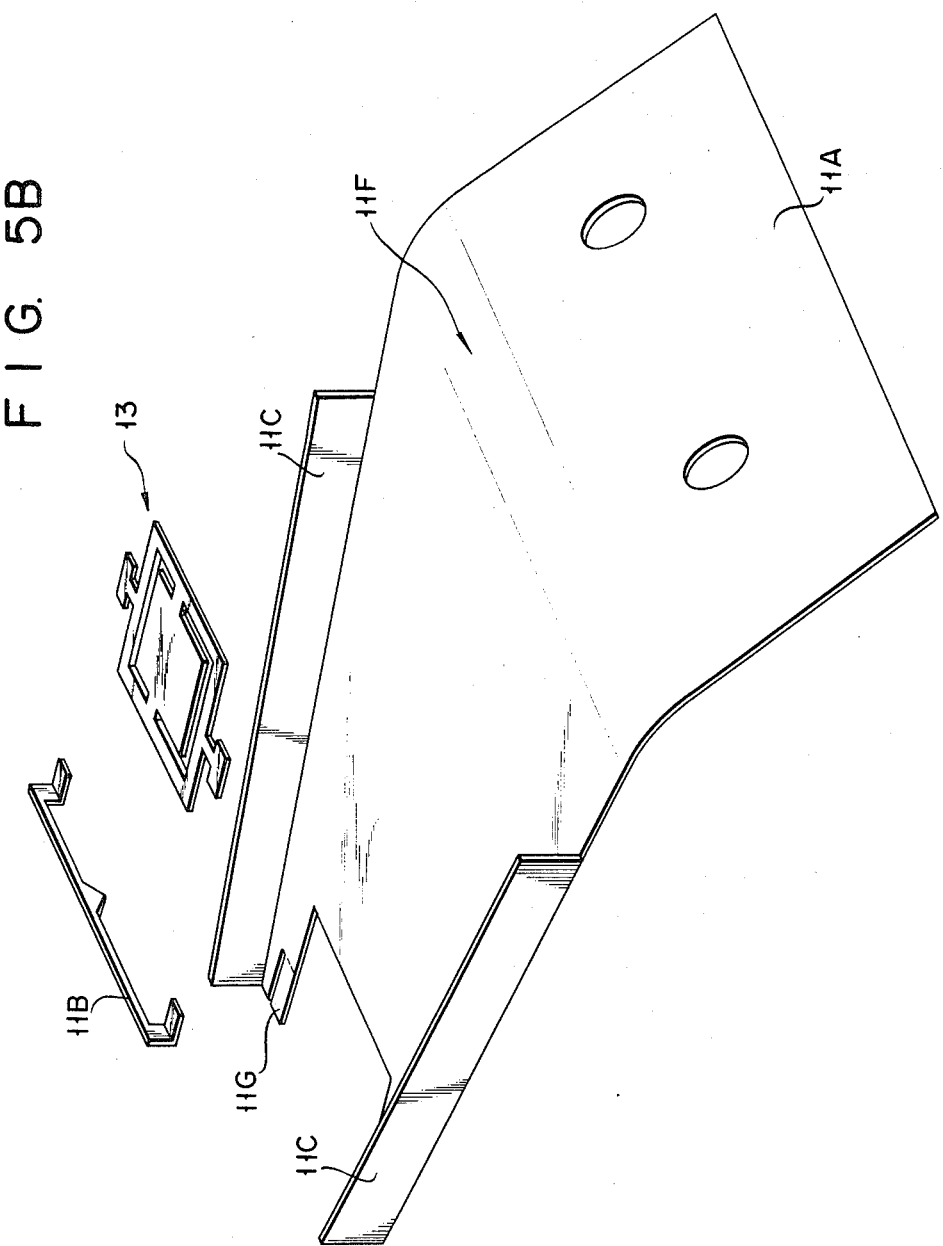

The construction of supporting member 11 is not limited to the above-mentioned structure. For example, supporting member 11 may be of the shape shown in FIG. 5A. Supporting member 11 in FIG. 5A is different from that in FIG. 3A in the construction of pivot 11B. Here, pivot 11B is formed different from supporting member 11 as shown in FIG. 5B, and fixed to supporting member 11. Member 11 may be constructed as shown in FIG. 5C. The features of member 11 shown FIG. 5C are below. (1) Portion 11 is divided into two portions. (2) Rigid portion 11E is bent along line 11L. (3) Gimbal spring 13 is mounted on portions 11G so as to be parallel to the edge portion of member 11. To provide sufficient rigidity to rigid portion 11E, connecting points 11M are welded, for example.

Figure 5D:
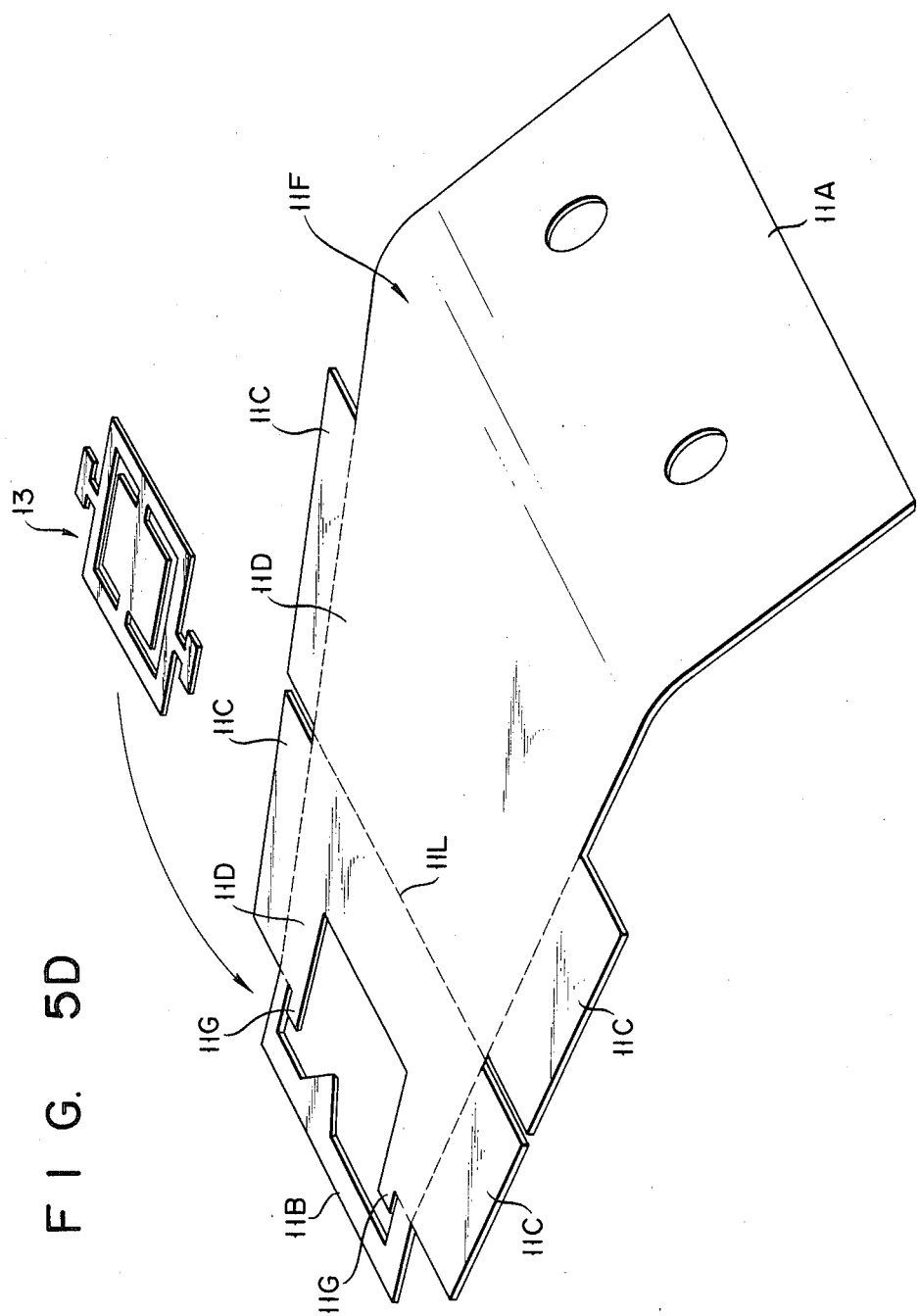

Member 11 may be constructed as described below. A flat plate of the shape shown in FIG. 5D is formed. The spring portion 11F of the flat plate is deformed. Parts 11C are bent along the broken lines. Rigid portion 11E is bent along broken lines 11L. Connecting portions 11M are welded. Gimbal spring 13 is mounted on portion 11G. parts 11G are not bent.

Gimbal spring 13 and supporting member 11 are not necessarily constructed separately. As shown in plan views in FIGS. 6A and 6B, gimbal spring 13 may be formed with openings 11E at parts of supporting member 11. When supporting member 11 is thin, this construction is effective. When supporting member 11 is thin, it is desirable to increase the areas of portions 11F for fixing pivot 11B to supporting member 11 to increase the rigidity of rigid portion of supporting member 11. The fixing area of head 17 to gimbal spring 13 is preferably increased.

To increase the rigidity of rigid portion 11D of supporting member 11, members 11H shown in FIG. 7 may be, for example, bonded to rigid portion 11D, or the may be thickened. The invention is not limited to the above particular construction, but any construction may be included if the rigidity of the portion of the supporting member is large and the supporting member partly has an elasticity. And a member having large rigidity (rigid portion) and a member having an elasticity (spring portion) may be formed separately.

In the embodiments described above, the supporting member 11 is fixed to the backs of the carriage 1 and the arm 7 through the openings. The present invention is not limited to the particular embodiments. For example, as shown in side view of FIG. 8A, supporting members 11 and 19 may be mounted on the ends of surfaces of the arm and the carriage which face each other. In the construction in FIG. 8A, the arm and the carriage can be reduced in size to decrease the weight of the carriage assembly. Supporting member 11 or 19 may be mounted on the inner surface of carriage 1 or arm 7 as shown in side view of FIG. 8B. A recess may be formed in carriage 1 to fix supporting member 11 thereto as shown in sectional view in FIG. 8C. A step may be formed on the inner surface of the opening in FIG. 1 as shown in sectional view in FIG. 8D to fix supporting member 11 thereto.

In the embodiments, the arm stopper comprises plinth 27A, member 27B, and screw 27C. However the construction of the arm stopper is not limited to this. Screw 27C may be provided at carriage 1 or arm 7 as arm stopper, without plinth 27A and member 27B. In this case, the tip of screw 27C abuts against arm 7 or carriage 1. Member 27B and screw 27C may be provided on arm 7 and carriage 1 respectively, as the arm stopper without plinth 27A. The arm stopper may be constructed by only plinth 27A provided on carriage 1 or arm 7 without screw 27C and member 27B.

In the embodiments described above, the supporting members 11 and gimbal spring 13, and the supporting member 19 and the gimbal spring 21 are formed of the same shapes respectively. However, the supporting members and gimbal springs may be, for example, as shown in FIG. 18A, formed of different constructions. In FIG. 18A, supporting member 53 is mounted on arm 51. Gimbal spring 55 is mounted on supporting member 53. First head is fixed to gimbal spring 55. Supporting member 53 and gimbal spring 55 have same constructions as that shown in FIG. 3A. Supporting member 59 is fixed to carriage 57. Supporting member 59 has same construction as that shown in FIG. 3A.

Figure 9:
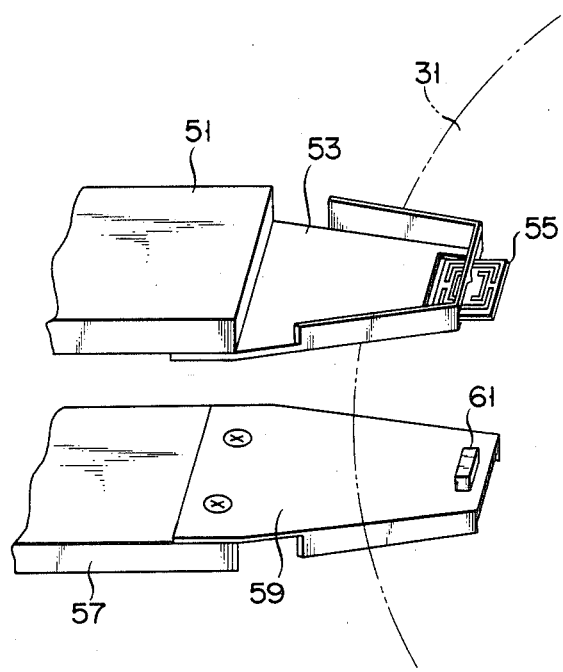

However, gimbal spring 63 may have a different construction from gimbal spring 13 shown in FIG. 18A. In FIG. 18A, gimbal spring 63 has thick bridges (shafts) in the radial direction of the medium 31. Therefore, it is more difficult for, head 61 to be inclined in the tangential direction of the medium 31 than in the radial direction thereof. Gimbal spring 63 may have a construction as shown in FIGS. 18B, 18C. In FIG. 18B, gimbal spring 63 has thick supporting bridges in the tangential direction of medium 31. Therefore, it is, more difficult for head 61 to be inclined in the radial direction of medium 31 than the other direction. In FIG. 18C, gimbal spring 13 have thick supporting bridges in both the tangential and radial directions of the medium 31. Therefore, it is more difficult for head 61 to be inclined in both the radial and tangential directions of medium 31 than the other head. Constructions of gimbal springs 55, 63 are not limited to those as shown in FIGS. 18A to 18C. Even gimbal spring 55 and gimbal spring 63 have different elasticity, any constructions can be selected. For example, gimbal spring 63 may be thicker than that of gimbal spring 55. And for example, head 61 may be fixed directly to the rigid portion of supporting member 11 without gimbal spring 63, as shown in FIG. 9.

In FIGS. 18A to 18C, head 61 hardly pitches or rolls, and hardly happens off-azimuth and off-track even if medium 31 is deflected or externally vibrated. In the embodiment, head 61 can move in vertical direction and also can slightly pitch or roll. Therefore, a stress applied to a medium 31 by heads is reduced and the durability of the medium is increased comparing to the conventional structure whose head is fixed to carriage. And even if the medium decreases in diameter to increases the rigidity of medium, the magnetic head contacts properly the medium. The head of the arm side can move upward and downward, pitch and roll by the elasticity of supporting member 51 and gimbal spring 55. Thus, the heads can preferably contact with the medium because one head follows to the other head due to the gimbal spring even if this head inclines relative to the nominal plane of the medium.

When the head supporting mechanism of the construction described above is in operation, two heads 15, 23 press through medium 31 to one another. Therefore, head 15 is disposed substantially at a reference position. Arm 7 is pulled up when medium 31 is attaching to and detaching from the floppy disk apparatus. Thus, gimbal spring 11 may jump up, and head 15 may unnecessarily jump up. In this state, when medium 31 is removed from a floppy disk apparatus, or when medium 31 is inserted into the floppy disk apparatus, windows 35 (FIG. 2) of jacket 33 is engaged with head 15 so that medium 31 is hardly removed from the floppy disk apparatus. To eliminate this drawback, the construction that a head supporting mechanism is swung back when the medium 31 is attached to or detached from the floppy disk apparatus is known. However, this construction is very complicated. To eliminate these drawbacks, a medium guide for guiding the medium so that the medium is not engaged with the head and a head stopper for preventing the head from jumping out are preferably provided in the head supporting mechanism of the above construction a conventional medium guide is disclosed in U.S. Pat. No. 4,315,293, Winkler.

Figure 10:
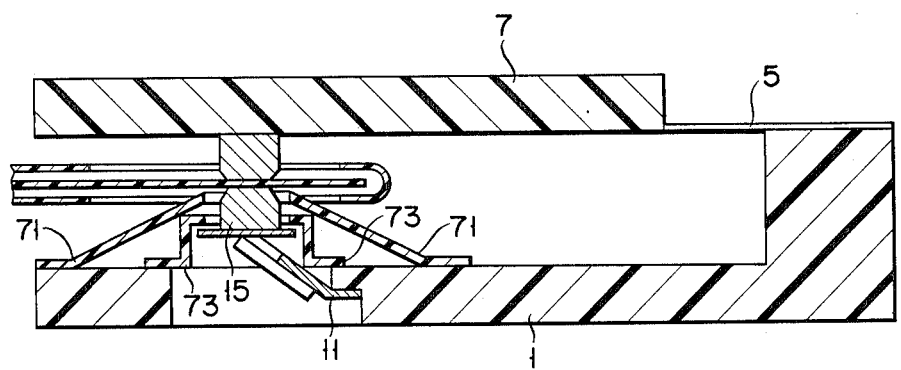
Figure 11:
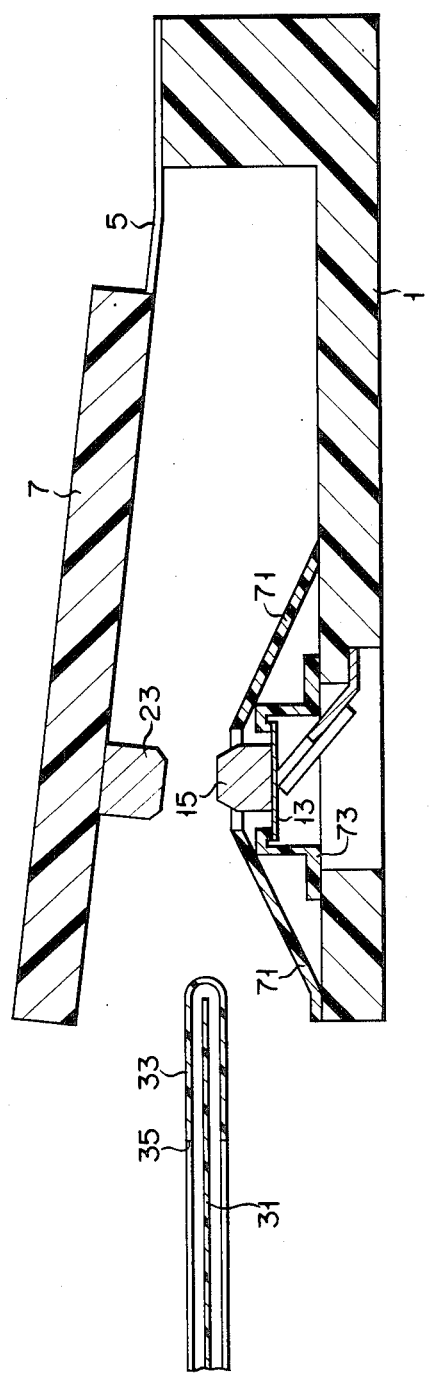

An embodiment that a medium guide and a head stopper are added to the embodiment described above will be described. FIGS. 10 and 11 are sectional views showing examples of head supporting mechanism of the construction shown in FIGS. 1 and 2, provided with medium guide 71 and head stopper 73. FIG. 10 to FIG. 16 are sectional views of schematic head supporting mechanism to described the operation of medium guide 71 and head stopper 73. As shown in FIGS. 10 and 11, a semispherical (plate-placed in upside down state) medium guide 71 is provided on carriage 1. Medium guide 71 has an opening formed partly, and the end of head 15 is exposed from the opening. Head stopper 73 for limiting the upward movement of head 15 to a predetermined position is formed inside medium guide 71. In this embodiment, head 15 is pressed through floppy disk 31 by head 23 at loading time as shown in FIG. 5 and head 15 is accordingly disposed substantially at reference position.

Figure 12:
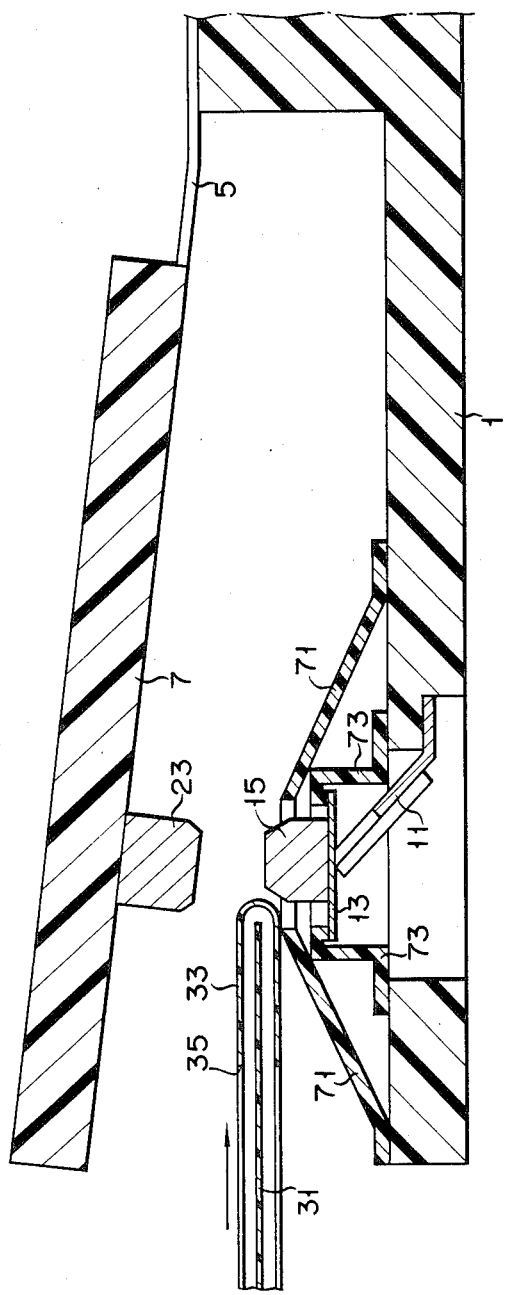
Figure 13:
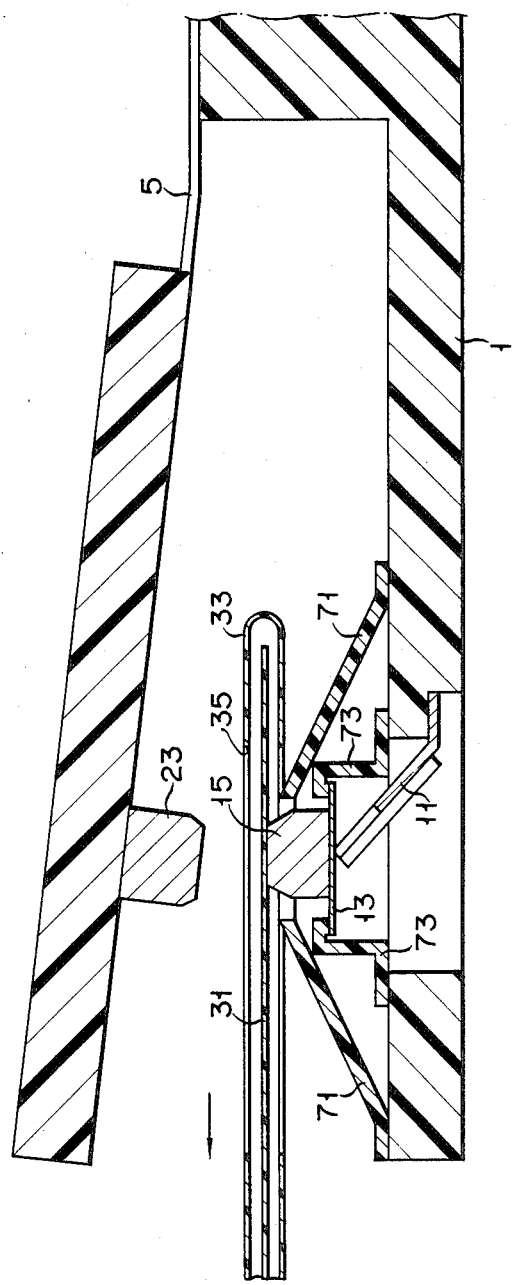

When arm 7 moves upwardly in FIG. 11, head 15 tends to move upwardly by a force of supporting member 11. However, since gimbal spring 13 partly contacts stopper 73, it limits the upward movement of head 15. The head 15 does not considerably jump out of medium guide 51 in this state. Thus, when medium 31 is inserted to the floppy disk apparatus, medium 31 is guided by medium guide 71 as shown in FIG. 12 in this state, and window 35 is not engaged with head 15. When medium 31 is removed from the floppy disk apparatus, medium 31 is guided by medium guide 71 as shown in FIG. 13, and head window 35 is not engaged with head 15. Thus, by using the construction shown in FIGS. 10, 11, even if the head supporting mechanism of the construction shown in FIGS. 1 and 2 is used, medium 31 can be readily attached to or detached from the floppy disk apparatus. Thus, the structure of the head supporting mechanism can be simplified as compared with the conventional one that the head supporting mechanism is swung back when the medium is inserted or removed to and from the floppy disk apparatus.

FIG. 14 show second examples of a medium guide and a head stopper. The same numerals as in the first embodiment in FIGS. 10 to 13 denote the same parts in the second embodiment, and the detailed description will be omitted. The second embodiment in FIG. 14 is the same as that in FIGS. 10 and 11 except that medium guide 75 and head stopper 77 are integrally formed. FIG. 15 shows a third embodiment of a medium guide and a head stopper. The third embodiment is constructed so that stopper 79 does not limit the movement of a gimbal spring 13 but limit the movement of supporting member 11. Head stopper 79 is fixed to carriage 1. When supporting member 11 is extended, it contacts head stopper 79 to suppress that supporting member 11 further extends. FIG. 16 shows fourth embodiment of a medium guide and a head stopper. The fourth embodiment is similar to the construction in FIG. 15, except a part of medium guide 81 is extended to form head stopper 83.

The construction of the medium guide is not limited to the semispherical shape. The medium guide may coat the head, the gimbal spring and the supporting member with less corners and medium guide the medium so as not to damage the medium when a medium is inserted and removed to and from the floppy disk apparatus. For example, the medium guide may be of pyramid shape. The head stopper may have any construction if the head stopper can prevent the head from unnecessarily jumping out. The embodiments have been described only in the case that the medium guide and the head stopper are provided at carriage 1. However, the medium guide and the head stopper may be provided at both carrier 1 and arm 7. Both the medium guide and the head stopper may not be necessarily provided, but only the medium guide or the head stopper may be provided.

The embodiments described above, the present invention is applied to one side open type head supporting mechanism (similar to Tandon et al.). The present invention may also be applied to both sides open type heads supporting mechanism (similar to Castrodale et al). An embodiment in which the invention is applied to both sides open type heads supporting mechanism will be described with reference to FIG. 17. The mechanism has two swing arms 91, 93. Supporting members 95, 97 of the constructions shown in FIG. 3A are mounted on arms 91, 93. Gimbal springs 95, 97 are fixed to of supporting members 95, 97. Heads 15, 23 are attached to gimbal springs 99, 101. Leaf springs 103, 105 are fixed to swing arms 91, 93 respectively. Leaf springs 103, 105 are fixed t carriage 107. Arm stopper 109, 111 are fixed to carriage 107. Load springs 113, 115 are fixed to carriage 107. Load springs 113, 115 press swing arms 91, 93 against arm stopper 109, 111, thus bringing swing arms 91, 93 into a stationary condition. The construction of the mechanism can provide the same advantages as those of the embodiments described above such as good contacting characteristics of the heads with the medium and no damage of the medium.

The gimbal springs are not limited to the shape and the construction shown in FIGS. 1 and 2. If the head can incline at an arbitrary angle within a predetermined range and the gimbal springs have sufficient elasticity, the gimbal springs may have any shape (e.g., round, triangular) and structure.

What is claimed is:
1. A head supporting mechanism for a disk drive, which has first and second magnetic head means for recording data on and/or reading data from a rotating flexible recording medium in close operative relationship with both surfaces of the recording medium, comprising:
 a carriage movable in a direction parallel to a nominal plane of the medium;
 first arm means, connected to the carriage at one end thereof, for supporting the first head in an operative relationship with the medium in the recording and/or reading of the data;
 second arm means for supporting the second head means in an operative relationship with the medium in the recording and/or reading of the data, the second arm means being connected to the carriage so that the second arm means faces the first arm means and the second head means is opposed to the first head means;
 at least one of the first and second arm means including head supporting means, cantilevered by the one of the first and second arm means at one end portion, for supporting the corresponding one of the first and second head means on the other end portion, the free end portion of the head supporting means being elastically pivotable relative to the corresponding one of the first and second arm means in a direction towards and away from the other arm means and having high rigidity in any other directions;

at least one of the first and second arm means being cantilevered by the carriage, and thus the free end portion thereof being movable toward and away from the free end portion of the other arm means;

arm loading means for imposing a force on the first and second arm means in such a direction that the first and second arm means close with each other;

arm stopper means for preventing the first and second arm means form closing with each other over a predetermined distance therebetween; and the head supporting means of the one of the first and second arm means generating a loading force for maintaining the close operative realtionship of the first and second head means with the corresponding surface of the medium despite tendency of the medium to deviate from its nominal plane by being deflected by the arm loading means when the arm stopper means has inhibited the relative movement of the first and second arm means.

2. A head supporting mechanism according to claim 1, wherein the head supporting means includes gimbal means, mounted on the free end portion thereof, for supporting the corresponding one of the first and second magnetic head means, and the gimbal means permits the magnetic head means to incline in at least one direction.

3. A head supporting mechanism according to claim 2, wherein the head supporting means further includes pivot means for supporting the gimbal means from the opposite side with the corresponding magnetic head means and limiting deformation of the gimbal means in a direction normal to the plane thereof when the corresponding head means is in contact with the medium.

4. A head supporting mechanism according to claim 1, wherein the second arm means has a substantially invariant position in a direction normal to the normal plane of the medium.

5. A head supporting mechanism according to claim 1, wherein
at least one of said first and second arm means has a limiting means for limiting the pivotal movement of the free end portion of the head supporting means by the elasticity thereof, when the first and second head means are not in contact with the medium.

6. A head supporting mechanism according to claim 1, wherein at least one of the first and second arm means has guiding means for guiding the medium in insertion and/or removal thereof between the first and second head means so that the medium smoothly moves between the first and second head means.

7. A head supporting mechanism according to claim 1, wherein
the arm stopper means includes means for adjusting the distance between the first and second arm means when the first and second head means is maintained in the close operative relationship with the medium.

8. A head supporting mechanism according to claims 1, wherein the head supporting means includes a free end portion extending at a predetermined angle to the corresponding arm means.

9. A head supporting mechanism according to claim 8, wherein the free end portion of the head supporting means includes means for supplying the rigidity thereof.

10. A head supporting mechanism according to claim wherein both of the first and second arm means includes the head supporting means.

11. A head supporting mechanism according to claim 10, wherein the head supporting means of the first and second arm means have substantially the same spring constant in the direction of the pivotal movement thereof.

12. A head supporting mechanism according to claim 10, wherein the head supporting means of the first and second arm means each includes gimbal means, mounted on the free end portion thereof, for supporting the corresponding one of the first and second magnetic head means, and the second gimbal means permits the corresponding head means to incline in at least one direction.

13. A head supporting mechanism according to claim 12, wherein the head supporting means of the first and second arm means each includes second pivot means for supporting the gimbal means from the opposite side with the corresponding magnetic head means and limiting deformation of the gimbal means in a direction normal to the plane thereof when the corresponding head means is in contact with the medium.

14. A head supporting mechanism according to claim 12 wherein the gimbal means for the first magnetic head means has a different degree of inclining movement from that for the second magnetic head means.

* * * * *